United States Patent [19]
Rognoni

[11] 4,355,926
[45] Oct. 26, 1982

[54] ADJUSTABLE SUPPORT FOR UNDERWATER PIPE A SHORT DISTANCE FROM THE SEA BED

[75] Inventor: Antonio Rognoni, Pavia, Italy

[73] Assignee: Corak Limited, London, England

[21] Appl. No.: 231,112

[22] Filed: Feb. 3, 1981

[30] Foreign Application Priority Data

Feb. 19, 1980 [IT] Italy ................................ 20004 A/80

[51] Int. Cl.³ ............................ F16L 1/04; F16L 3/00
[52] U.S. Cl. .................................. 405/172; 405/158; 248/49
[58] Field of Search ....................... 405/154, 156–158, 405/171–173; 248/49, 55; 138/105, 106; 137/343, 236, 236 S

[56] References Cited

U.S. PATENT DOCUMENTS

| 4,017,046 | 4/1977 | Hicks | 248/49 X |
| 4,109,480 | 8/1978 | Sumner | 405/173 |
| 4,147,455 | 4/1979 | Bertaccini | 405/172 |
| 4,252,466 | 2/1981 | Berti et al. | 405/172 |

*Primary Examiner*—Ernest R. Purser
*Assistant Examiner*—Nancy J. Pistel
*Attorney, Agent, or Firm*—Morgan, Finnegan, Pine, Foley & Lee

[57] ABSTRACT

A support particularly suitable for underwater pipe located a short distance from the sea bed. The support has a very simple structure which is easy to manuever, and includes a tubular frame with a square or rectangular base resting on four plates which can be adapted to the slope of the sea bed, and a semicircular saddle which accommodates the pipe to be supported and is connected to the base of the frame by two hydraulic jacks and four inclined telescopic legs.

7 Claims, 2 Drawing Figures

ADJUSTABLE SUPPORT FOR UNDERWATER PIPE A SHORT DISTANCE FROM THE SEA BED

This invention relates to a support for underwater pipe located a short distance from the sea bed, preferably less than 80 cm.

The object of the support of the present invention is to reduce the width of the free spans, eliminate sag due to bending, and prevent the pipe from being subjected to vibration by the sea current acting thereon.

Various types of adjustable supports for underwater pipes are known. However, they have very complicated structures which for installation require the use of firmly anchored depot ships.

Moreover, such supports cannot be used if the pipe to be supported is very close to the sea bed because of their considerable overall vertical height.

The U.S. patent application No. 081,489 filed on Oct. 3, 1979, now U.S. Pat. No. 4,252,556 describes a support which enables a pipe to be supported whatever the distance is from the sea bed.

However, this support has a rather complicated structure, and requires numerous operations for its installation.

In addition, once it has been installed below the pipe and its released upper part has been recovered, there remain on the sea bed and projecting above the pipe four support legs having teeth of integral racks which constitute a danger for fishermen's nets. The support according to the present invention has a much simpler structure, can be installed even at great depth using only submarines, and has been designed such that the operations necessary for its installation are few and simple. In addition, when installed it presents no projection.

BRIEF DESCRIPTION OF THE DRAWINGS

With respect to the illustrative embodiment of the support of the present invention shown in the accompanying drawings.

DETAILED DESCRIPTION OF THE PREFERRED EMBODIMENT

Figure 1:
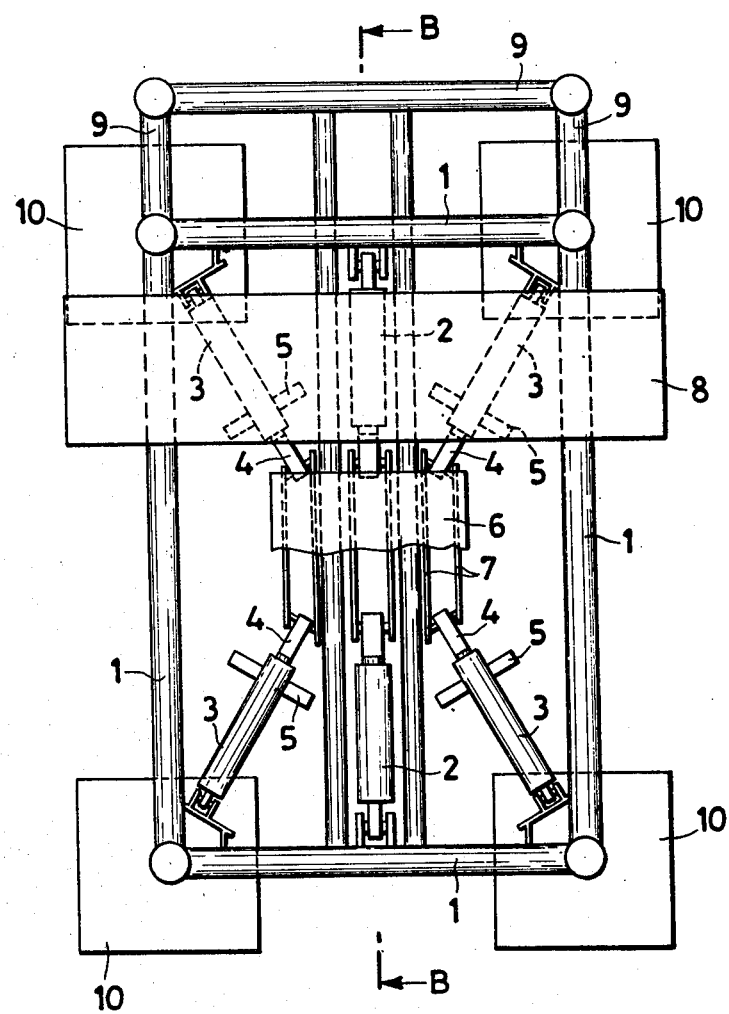
FIG. 1 is a horizontal section through the support taken on the line A—A of FIG. 2.
Figure 2:
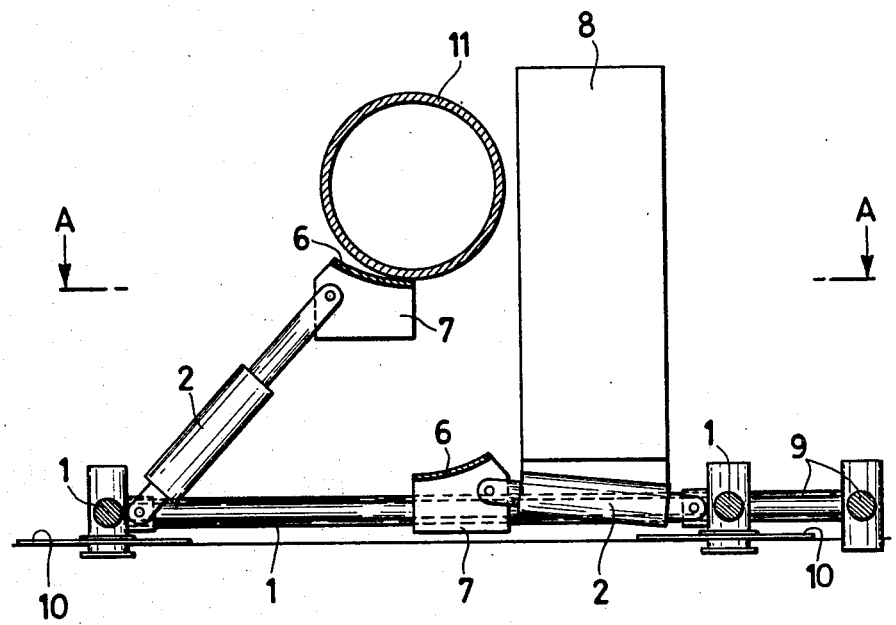
FIG. 2 is a vertical section through the same support taken on the line B—B of FIG. 1. In the vertical section, the right hand half represents the support saddle 6 with the jacks 2 lowered into their initial position, while the left hand half represents the same saddle 6 but with the jacks 2 raised into their final position.

Referring now in detail to the drawings, the support according to the present invention has:

(1) a tubular frame 1 with a square or rectangular base resting on four plates 10 which are adaptable to the slope of the sea bed;

(2) two hydraulic jacks 2, each of which, as shown, is connected by hinges at its outer or on one end to two opposite sides of the frame, and at its inwardly extending other end to the accommodation saddle 6 which is within the perimeter of the frame base and which supports the pipe 11, the axes of said jacks changing their contained angle as they raise and lower the saddle 6 (FIG. 2);

(3) four inclined telescopic legs for supporting the saddle 6, hinged at their lower end to the four corners of the base frame and at their upper end to the four corners of the saddle 6, each leg having two coaxial tubes, of which the outer tube 3 acts as a guide, and the inner tube 4 slides in the first and has welded along it two opposing gullet toothed racks;

(4) four devices for locking the telescopic legs, including pins 5 which on insertion into the rack teeth prevent the racks from sliding downwards;

(5) an accommodation saddle 6 for the pipe 11, faced with insulating material and reinforced in its lower part by vertical fins 7;

(6) a block of floating material 8 hooked to the tubular frame and recoverable when installation is complete, and, which as shown, is offset from the center of gravity of the frame 1 to accomodate the position of the saddle 6;

(7) a tubular counterweight 9 for balancing the upward thrust of the float 8 which, as shown, is secured to the end of the frame 1 adjacent the offset float.

The operation involved in installing the support is very simple. The support is prepared either on shore or on the depot ship. The support, loaded with the block of floating material 8, such that the entire assembly has a positive residual weight in water, is lowered on to the sea bed in proximity to the point where its installation is scheduled. The support is then taken over by the submarine and arranged with the saddle 6 under the pipe to be supported 11. The block of floating material 8 is unhooked from the structure and recovered for use with a further support.

On operating the jacks 2, these lift the saddle 6 and the four telescopic legs hinged to it. The upward movement of the saddle and telescopic legs continues until the saddle comes into contact with the pipe and lifts it by the amount necessary in order to eliminate the sag due to bending. At this point, the four locking devices 5 for the telescopic legs are operated, and the support remains locked in its final position together with the pipe.

I claim:

1. In an adjustable support for underwater pipe located at a short distance from the sea bed, preferably at less than 80 cm, the improvement comprising:

(a) a frame having a base with parallel segments and intersecting portions resting on plate means adaptable to the slope of the sea bed;

(b) a saddle within the perimeter of said base of the frame for supporting the underwater pipe thereon when the adjustable support is on the sea bed and positioned below the underwater pipe;

(c) a pair of hydraulic jacks connected at opposing points to parallel segments of said base of the frame at their outer ends and extending inwardly and connected to said saddle at its other ends, wherein said jacks are adapted to raise and lower said saddle with said jacks raising said saddle to come into contact with the underwater pipe to support and lift it to eliminate bending thereof when the adjustable support is on the sea bed and positioned there below;

(d) a plurality of inclined telescopic legs for supporting said saddle which are hinged at their lower ends to said corner portions of the frame and which are hinged at their upper ends to said saddle, and wherein said legs move in a telescopic manner as said jacks raise and lower said saddle;

(e) means insertable in said telescopic legs for locking said legs in their extended position when said saddle has been raised by said jacks; and (f) a float releasably connected to the frame which provides a positive residual weight to the support as it is lowered to the sea bed, whereupon said float is adapted to be released from the frame.

2. The adjustable support of claim 1, wherein the frame is tubular and said base is a square resting on four corner plates.

3. The adjustable support of claim 1, wherein the frame is tubular and said base is a rectangle resting on four corner plates.

4. The adjustable support of claim 1, wherein there are four telescopic legs for supporting the saddle, each leg having outer and inner coaxial tubes, the outer one of which is hinged to the frame and the inner one of which slides within said outer tube and is hinged to said saddle.

5. The adjustable support of claim 4, wherein said insertable means extend through the telescopic legs and prevent said inner tubes from sliding within their outer tubes.

6. The adjustable support of claim 1, wherein said float is offset from the center of gravity of the frame to accomodate the position of the saddle, and the support includes a counterweight secured to the frame adjacent said offset float to balance the upward thrust thereof.

7. An adjustable support for underwater pipe located at a short distance from the sea bed, preferably, at less than 80 cm, the improvement comprising:

(a) a tubular frame having a four-sided base with parallel sides and intersecting 90 degree corners which rest on four plates adaptable to the slope of the sea bed;

(b) a saddle within the perimeter of said base for supporting the underwater pipe thereon when the adjustable support is on the sea bed and positioned below the underwater pipe;

(c) a pair of hydraulic jacks connected at opposing points to parallel sides of said base at their outer ends and extending inwardly and connected to said saddle at their outer ends, wherein jacks raise and lower said saddle with said jacks raising said saddle to come into contact with the underwater pipe to support and lift it to eliminate bending thereof when the adjustable support is on the sea bed and positioned below the underwater pipe;

(d) four inclined telescopic legs for supporting the saddle, each of which has outer and inner coaxial tubes, the outer one of which is hinged to a corner of the base of the frame and the inner one of which is hinged to the saddle, wherein said inner tube slides within its outer tube as the saddle is raised and lowered by said hydraulic jacks;

(e) means insertable through said legs which lock them in place when the hydraulic jacks have raised the saddle to its supporting and lifting position; and (f) a float releasably connected to the tubular frame which provides a positive residual weight to the support as it is lowered to the sea bed, whereupon said float is adapted to be released and is recoverable.

* * * * *